United States Patent [19]

Miyanohara et al.

[11] 4,125,466

[45] Nov. 14, 1978

[54] TREATMENT OF SLUDGE COMPRISING BIOLOGICAL AGGREGATE

[75] Inventors: Isao Miyanohara; Hiroshi Miyazaki; Hideo Kawamura, all of Shin-nanyo, Japan

[73] Assignee: Toyo Soda Manufacturing Co., Ltd., Yamaguchi, Japan

[21] Appl. No.: 798,171

[22] Filed: May 18, 1977

[30] Foreign Application Priority Data

May 18, 1976 [JP] Japan .................................. 51-56114
May 18, 1976 [JP] Japan .................................. 51-56115

[51] Int. Cl.² .............................................. C02C 3/00
[52] U.S. Cl. ...................................... 210/67; 210/10
[58] Field of Search ................ 210/10, 45, 47, 65–67, 210/6, 18, 51, 52, 53

[56] References Cited

U.S. PATENT DOCUMENTS

| 2,300,693 | 11/1942 | Oswald | 210/10 |
| 3,173,863 | 3/1965 | Oster et al. | 210/10 |
| 3,262,877 | 7/1966 | Le Compte, Jr. | 210/47 |
| 3,377,271 | 4/1968 | Cann | 210/18 |
| 4,017,391 | 4/1977 | Black | 210/45 |

FOREIGN PATENT DOCUMENTS 50-103173  8/1975  Japan.
1,318,861  5/1973  United Kingdom ...................... 210/67

*Primary Examiner*—Charles N. Hart
*Assistant Examiner*—Benoit Castel
*Attorney, Agent, or Firm*—Oblon, Fisher, Spivak, McClelland & Maier

[57] ABSTRACT

A treatment for improving the filtering characteristics of the sludge is attained by adding a magnesium compound with or without an iron salt and further adding a base to maintain the pH of the sludge at higher than 9.0.

2 Claims, No Drawings

TREATMENT OF SLUDGE COMPRISING BIOLOGICAL AGGREGATE

BACKGROUND OF THE INVENTION

The present invention relates to an improved treatment of sludge which comprises biological aggregate which is used for the treatment of drainage etc., more particularly it relates to improve filtering characteristics of the sludge.

The consideration for preventing environmental pollution has been discussed and the control of the drainages has been severe and various drainage treatments have been carried out.

The microorganism treatment of the drainages is indispensable for the treatment of the drainage containing organic materials. The microorganism treatment has been widely applied for various treatment of industrial waste and for removement of nitrogen sources which cause nutritious water in lakes or red sea water. Thus, the microorganism treatments have been developed.

The microorganism treatment has been considered to be remarkably advantageous and has been widely applied, however serious problem has been caused. The problem is the treatment of the proliferated microorganism. In the drainage treatment, the sludge caused by the proliferated microorganism treatment is called as excess sludge to be discharged out of the system.

The discharge sludge containing the microorganism is pasty and tacky material which has high water content and is dehydrated and burnt or used in the reclamation or for other purposes.

However, it has been difficult to dehydrate the sludge by a filtration etc. because of tackiness. Accordingly, the treatment has been unsatisfactory and the treated sludge contains relatively high water content and serious disadvantage has been found for the further treatment.

Various treatments have been proposed to improve the dehydration of the sludge such as by an addition of lime, ferric chloride, polyaluminum chloride, polymer coagulants etc. before the filtration.

However, the effects are not satisfactory and impart slight decrease of the load of the filter etc. or cause other troubles. The problem has not been satisfactorily dissolved.

SUMMARY OF THE INVENTION

It is an object of the present invention to provide an improved treatment of a sludge comprising biological aggregate for improving the filtering characteristics of the sludge and to impart suprising result by a simple method.

The foregoing and other objects of the present invention have been attained by a treatment for improving the filtering characteristics of the sludge by adding a magnesium compound with or without an iron salt and further adding a base to maintain the pH of the sludge at higher than 9.0.

DETAILED DESCRIPTION OF THE PREFERRED EMBODIMENTS

The sludges containing biological aggregate are sludge containing biological organic materials as main components which are the active sludge, nitration sludge, denitrogen sludge, digestive sludge which are used for drainage treatments and sludges containing natural algae vomit sludge, microorganism sludge used for synthesis in fermentation.

The main object of the present invention is to improve the filtering characteristics of the sludge containing biological sludge. In the process utilizing microorganism, the process can be effectively improved by the improved treatment of the sludge according to the present invention.

It has been well-known to add lime and an iron salt to a sludge. In the present invention, the amount of these additives can be remarkably decreased to impart high effect because of the special characteristics of the magnesium compound.

When lime and the iron salt are added, relatively large amount of the additives are added, whereby the weight of the solid components are increased to more than 50% sometimes about 100%.

In the case of the present invention, the increase of the weight caused by the addition of the additive can be negligible. Moreover the degree of improvement of the filtering characteristics are remarkably high.

In the conventional treatment, the pH of the treated sludge is high alkalinity such as about 12 to 13 because of the large amount of the lime added to cause various trouble. In the case of the present invention, it is possible to decrease pH. Accordingly, the present invention is remarkably advantageous from the view point of the cost of the additives and the efficiency of the filtering apparatus and the treatment of the filtered sludge (cake).

The magnesium compounds used in the present invention include magnesium hydroxide, magnesium chloride, magnesium sulfate, magnesium carbonate etc.

The iron salts include iron clorides and iron sulfates as ferrous and ferric compounds.

The bases can be sodium hydroxide, sodium carbonate, lime, ammonia etc. and lime is preferably used from the viewpoint of cost.

The amount of the magnesium compound is in a range of 0.5 to 100 wt.% of preferably 2 to 50 wt.% as Mg to the solid components of the sludge when an iron salt is not added. The pH of the sludge is maintained at higher than 9.0 by adding the base.

The amount of the magnesium compound is in a range of 0.1 to 20 wt.% preferably 0.2 to 5 wt.% as Mg and the amount of the iron salt is in a range of 0.1 to 20 wt.% preferably 0.2 to 5 wt.% as Fe to the solid components of the sludge when the iron salt is added.

The pH of the sludge is maintained at higher than 9.0 by adding the base.

When the base is added, the pH of the sludge rises corresponding to the amount of the base. The base is gradually consumed by the special reaction and the lowering of pH is caused in ageing, whereby it is necessary to gradually add the base until being stable of the pH.

The phenomenon of the consumption of the base is the inherent one caused in the addition of the magnesium compound.

The degree of the improvement of the sludge is higher when the amount of the base for maintaining the pH is larger because the pH lowering rate is faster (faster reaction velocity). The pH lowering rate is depending upon the type and concentration of the sludge and the type and amount of the magnesium compound and the pH value.

The phenomenon of the maintaining of pH by the addition of the base is different from the pH control and certain reaction is caused by the addition of the base. Accordingly, it is necessary to maintain pH by the addition of the base until completing the reaction because of the reaction. In usual, the time for maintaining the pH of higher than 9.0 is preferably longer than 30 minutes.

It is necessary to mix them so as to contact well after the addition of the magnesium compound and the base.

When the iron salt is added, in usual, the effect is increased by adding the iron salt after ageing the mixture to which the magnesium compound is added. After adding these additives, the mixture is stirred to improve the contact of the additives to the sludge. After adding the additives, the mixture is well mixed so as to contact them well.

The magnesium compound is added in a form of a powder, a slurry or a solution and the iron salt is added in a form of a solution and the base is added in a form of an aqueous solution or slurry.

The operation can be carried out by a continuous system or a batch system. After the operation, the sludge is improved and the filtering characteristics are improved. Accordingly, the sludge can be dehydrated for example by a filtration.

The water content of the cake is low, the cake can be advantageously treated or used. The treatment of the present invention will be further improved by the examples wherein the term of % designates % by weight.

EXAMPLE 1

Active sludge from an active sludge storage for a waste water from an acetic acid plant was concentrated to form a concentrated sludge (solid concentration of about 3.0%).

The concentrated sludge was charged for each 200 cc in beakers. The magnesium compounds were respectively added at ratios shown in Table 1 (magnesium hydroxide was added as power and the others were added as 10% aqueous solution) with slowly stirring by a jar tester and then, 10% milk of lime was added to maintain the pH to the specific values.

When the pH was higher than 9.0 or the amount of magnesium compound was large, the rate of consumption of the lime was high and the pH lowering rate was fast, the milk of lime was gradually added during 30 minutes so as to compensate. Because of the intermittent addition of milk of lime, the pH was fluctuated in the range of ±0.2 from the central value.

After 1 hour, the lowering of the pH became slow and after 3 hours, the filtering test was carried out under the consideration of the completion of the treatment of the sludge.

In the filtering test, 100 cc of each sample was filtered through a glass filter (G-4) (diameter of about 4 cm) which was precoated with 0.2 g of diatomaceous earth under a reduced pressure (degree of vacuum of 760 mmHg). The filtration characteristic was shown by the time needed for filtering 100 cc of the sample. The results are shown in Table 1.

The amounts of the magnesium compounds were shown by weight % of Mg to the solid components of the sludge. The pH maintained by the addition of the base was shown in the column of Addition of base.

As the reference, 10% milk of lime (weight % as Ca) was added instead of the magnesium compound, and after 3 hours, the treated sludge was used for the filtering test. The result was also shown in Table 1.

Table 1

| | Amount of additive (as Mg to solid component; wt.%) | | Addition of base (pH) | Filtering time (min.) |
|---|---|---|---|---|
| Invention | $MgCl_2$ | 30 | 10.5 | 9 |
| | " | 10 | 11 | 16 |
| | $MgSO_4$ | 30 | 9.5 | 26 |
| | " | 10 | 11 | 18 |
| | $Mg(OH)_2$ | 30 | 10.5 | 16 |
| | $MgCl_2$ | 20 | 11 | 13 |
| | " | 20 | 10.5 | 14 |
| | " | 20 | 9.5 | 35 |
| Reference | $MgCl_2$ | 20 | 7.5 | >180 |
| | " | 20 | 8.5 | >180 |
| | $Mg(OH)_2$ | 30 | 7.5 | >180 |
| | Lime(as Ca) | 50 | 13 | >180 |

EXAMPLE 2

In accordance with the process of Example 1, 200 cc of active sludge (solid concentration of about 1%) sampled from a sludge treating plant, was charged in each beaker, and the magnesium compounds and milk of lime at ratios shown in Table 2 were respectively added to the beaker with slowly stirring by a jar tester and the pH was maintained for 3 hours to attain the treatments of the sludges. The treated sludges were used for the filtering tests as Example 1. The results are shown in Table 2.

Table 2

| | Amount of additive (as Mg to solid components:wt.%) | | Addition of base (pH) | Filtering time (min.) |
|---|---|---|---|---|
| Invention | $MgCl_2$ | 30 | 12 | 8 |
| | $MgSO_4$ | 30 | 11 | 7 |
| | " | 30 | 10.5 | 8 |
| | " | 30 | 9.5 | 21 |
| | $Mg(OH)_2$ | 30 | 11 | 10 |
| | " | 30 | 10.5 | 10 |
| | " | 30 | 9.5 | 23 |
| Reference | $MgCl_2$ | 30 | 7.5 | 150 |
| | $MgSO_4$ | 30 | 8.5 | 90 |
| | " | 30 | 7.5 | 160 |
| | $Mg(OH)_2$ | 30 | 8.5 | 100 |

EXAMPLE 3

Nitrated sludge (solid concentration of about 1%) sampled from a nitration pilot plant in the third treatment wherein ammonia nitrogen in the drainage of the second treatment is converted with a microorganism to nitric acid or nitrous acid, was charged for each 200 cc in beakers. The magnesium compounds and milk of lime at ratios shown in Table 3 were respectively added to the sludge with slowly stirring by a jar tester and the pH was maintained for 5 hours in accordance with the process of Example 1. The treated sludges were used for the filtering test as Example 1. The results are shown in Table 3.

As the reference, 10% milk of lime (weight % as Ca) was added instead of the magnesium compound and after 5 hours, the treated sludge was used for the filtering test. The result was also shown in Table 3.

Table 3

| | Amount of additive (as Mg to solid components:wt.%) | | Addition of base (pH) | Filtering time (min.) |
|---|---|---|---|---|
| Invention | $MgCl_2$ | 20 | 10.5 | 5 |
| | " | 10 | 10.5 | 7 |
| | " | 5 | 10.5 | 15 |
| | $MgSO_4$ | 10 | 10.5 | 9 |
| | " | 5 | 10.5 | 16 |
| | $Mg(OH)_2$ | 10 | 10.5 | 13 |
| | $MgCl_2$ | 20 | 8.5 | 60 |
| | $MgSO_4$ | 10 | 8.5 | 80 |

Table 3-continued

| Reference | Amount of additive (as Mg to solid components:wt.%) | | Addition of base (pH) | Filtering time (min.) |
|---|---|---|---|---|
| | $Mg(OH)_2$ | 10 | 8.5 | 90 |
| | Lime(as Ca) | 50 | 13.5 | 90 |
| | " | 5 | 12 | 160 |

EXAMPLE 4

Active sludge from an active sludge storage for a waste water from an acetic acid plant was concentrated to form a concentrated sludge (solid concentration of about 1.5%).

The concentrated sludge was charged for each 300 cc in beakers. The additives and the iron salts (38% aqueous solution) shown in Table 4 were added to the concentrated sludge at ratios shown in Table 4.

The mixtures were respectively stirred by a jar tester for 20 minutes to obtain the treated sludges. The filtering test was carried out. The amounts of the additives are shown as % based on the solid components in the sludge. The results are shown in Table 4. In Table 4, the statement of pH in the column of addition of base means to gradually add 10% milk of lime for 20 minutes after the addition of the iron salt to maintain the pH.

The amounts of the additives were calculated as the chemical components except crystal water.

In the maintenance of pH, pH was descreased by the reaction after the addition of lime. Accordingly, lime was gradually added to maintain it. Because of the intermittent addition of lime, pH was fluctuated ±0.2 from the central value.

The filtering test was carried out as Example 1. The results are shown in Table 4.

As the references, the lime (powder) as $Ca(OH)_2$ and ferric sulfate were added to the concentrated sludge at the ratio shown in the column of Reference of Table 4 to obtain the treated sludges. The treated sludges were used for the filtering test. The pH of the treated sludges were higher than 13. The results are shown in Table 4.

Table 4

| | Amount of additive to solid components (wt.%) | | | | Addition of base (pH) | Filtering time (min.) |
|---|---|---|---|---|---|---|
| Invention | $Mg(OH)_2$ | 15 | $FeSO_4$ | 7 | 11 | 2 |
| | $MgCl_2$ | 15 | $FeSO_4$ | 7 | 10.5 | 2 |
| | | 7 | | 3 | 10.5 | 3 |
| | | 2 | | 2 | 10.5 | 6 |
| | $MgSO_4$ | 15 | $Fe_2(SO_4)_3$ | 7 | 11.5 | 2 |
| | | 7 | | 3 | 11.5 | 3 |
| | | 2 | | 2 | 11.5 | 7 |
| Reference | Lime | 100 | $Fe_2(SO_4)_3$ | 25 | | 5 |
| | " | 80 | " | 15 | | 12 |
| | " | 60 | " | 7 | | 30 |
| | " | 30 | " | 7 | | 55 |
| | " | 15 | " | 7 | | 55 |
| | " | 7 | " | 7 | | 80 |
| | " | 15 | " | 3 | | >180 |

Table 4-continued

| | Amount of additive to solid components (wt.%) | | Addition of base (pH) | Filtering time (min.) |
|---|---|---|---|---|
| | " | 7 | " | 3 | >180 |

EXAMPLE 5

Nitrated sludge (solid concentration of about 1%) sampled from a nitration pilot plant in the third treatment wherein ammonia nitrogen in the drainage of the second treatment is converted with a microorganism to nitric acid or nitrous acid, was charged for each 200 cc in beakers.

The additives in the solid form shown in Table 5 were respectively added at a ratio shown in Table 5 and each mixture was stirred for 30 min. and then, the iron salts shown in Table 5 were respectively added. As the lime of Example 4, 10% aqueous solution of sodium hydroxide was added and the mixture was stirred for 30 min. under maintaining pH to treat the sludge in a mixer.

The amounts of the additives are shown as chemical components without crystal water.

The treated sludge was used for the filtering test as Example 1. The results are shown in Table 5.

As the references, powdery lime $(Ca(OH)_2)$ and ferric chloride were added to the sludge at the ratio shown in Table 5 as Reference to treat the sludge.

The treated sludge was used for the filtering test as Example 1. The results are shown in Table 5 as Reference.

Table 5

| | Additive amount to solid component | | | | Addition of base (pH) | Filtering time (min.) |
|---|---|---|---|---|---|---|
| Invention | $Mg(OH)_2$ | 7 | $Fe_2(SO_4)_3$ | 7 | 11 | 2 |
| | $MgCl_2$ | 7 | $Fe_2(SO_4)_3$ | 7 | 11 | 2 |
| | | 3 | | 3 | 11 | 3 |
| | $MgSO_4$ | 7 | $Fe_2(SO_4)_3$ | 7 | 11 | 2 |
| | | 3 | | 3 | 11 | 3 |
| Reference | Lime | 30 | $FeCl_2$ | 7 | | 18 |
| | | 7 | | 7 | | 31 |

What is claimed is:

1. A method of treating sludge comprising biological aggregate which comprises adding to said sludge from 5 to 30 wt.% of a magnesium compound selected from the group consisting of magnesium hydroxide, magnesium chloride, magnesium sulfate and magnesium carbonate based on the solid component in said sludge; adding a base to maintain the pH of the sludge at greater than 9.5; and subsequently filtering said sludge.

2. A method of treating sludge comprising biological aggregate which comprises adding to said sludge from 2 to 15 wt.% of a magnesium compound selected from the group consisting of magnesium hydroxide, magnesium chloride, magnesium sulfate and magnesium carbonate and from 2 to 7 wt.% of an iron salt selected from the group consisting of ferrous chloride, ferric chloride, ferrous sulfate and ferric sulfate based on the solid component in said sludge; adding a base to maintain the pH of the sludge at greater than 9.5; and subsequently filtering said sludge.

* * * * *